United States Patent [19]

Valavaara

[11] Patent Number: 4,495,768
[45] Date of Patent: Jan. 29, 1985

[54] HYDROSTATIC TRANSMISSIONS

[75] Inventor: Viljo K. Valavaara, Milton, Canada

[73] Assignee: Inventors Compendium International Corp., Don Mills, Canada

[21] Appl. No.: 357,495

[22] Filed: Mar. 12, 1982

[51] Int. Cl.³ .............................................. F16D 31/06
[52] U.S. Cl. ...................................... 60/414; 60/486; 60/488
[58] Field of Search ................ 60/487, 488, 486, 414, 60/419, 428, 429, 430

[56] References Cited

U.S. PATENT DOCUMENTS

| | | | |
|---|---|---|---|
| 2,678,536 | 5/1954 | Morgan | 60/53 |
| 2,679,139 | 5/1954 | Posson | 60/53 |
| 2,687,049 | 8/1954 | Ebert | 74/687 |
| 3,131,539 | 5/1964 | Creighton et al. | 60/487 |
| 3,165,069 | 1/1965 | Adamek | 60/488 |
| 3,404,584 | 10/1968 | Trautmann | 60/487 |
| 3,626,810 | 12/1971 | Morey | 91/492 |
| 3,808,814 | 5/1974 | Macy | 60/487 |
| 3,835,752 | 9/1974 | D'Amata | 91/492 |
| 4,075,843 | 2/1978 | Leker | 60/487 |

FOREIGN PATENT DOCUMENTS

| | | |
|---|---|---|
| 284499 | 11/1928 | Canada . |
| 547761 | 10/1957 | Canada . |
| 574429 | 4/1959 | Canada . |
| 606036 | 9/1960 | Canada . |
| 864859 | 3/1971 | Canada . |
| 1074665 | 4/1980 | Canada . |
| 2701302 | 7/1978 | Fed. Rep. of Germany ........ 60/488 |

Primary Examiner—Robert E. Garrett
Assistant Examiner—Scott L. Moritz
Attorney, Agent, or Firm—Ridout & Maybee

[57] ABSTRACT

In a hydrostatic transmission of the type in which a motor and a variable displacement pump are coupled within a casing, both the motor and the pump are of the radial displacement type and each includes two oppositely phased reaction surfaces, so as to enable improved dynamic balance and a simpler and more robust construction. An engine starting function may also be provided.

6 Claims, 5 Drawing Figures

HYDROSTATIC TRANSMISSIONS

This invention relates to integrated hydraulic variable speed transmissions of the type in which an input shaft drives a hydraulic pump/motor unit, which in turn drives a second hydraulic pump/motor unit driving an output shaft, at least one of the units being of variable capacity so as to change the transmission ratio.

Various proposals have been made for transmissions of this type, because they provide a gear ratio which is infinitely variable within its working range and is relatively easily controlled, but to the best of applicant's knowledge such integrated transmissions have not met with wide acceptance, two principal reasons being low efficiency and high cost. The low efficiency arises from that fact that in most arrangements there are substantial pumping and motor losses under normal running conditions, whilst under starting conditions the motor is operating at low speeds and thus low efficiency. Proposals have been made to overcome this problem by connecting one of the rotor and stator of the first unit with the input shaft and the other to the output shaft so that rotational velocity of the output shaft may be algebraically summed with that of the input shaft. This permits a direct drive condition in which neither pump nor motor is operating, and a starting condition in which the motor is rotating at the same rate as the input shaft but in the opposite direction so that the net output rotational velocity is zero, although both pump and motor are operating at efficient speeds. Such an arrangement is described in U.S. Pat. No. 3,131,539 issued May 5, 1964 to Creighton et al. That transmission employs two axial piston swash plate pump/motor units. The input shaft is connected to the rotor of a first unit whose swash plate is mounted in the transmission casing for tilting to adjust the displacement of the unit. The swash plate of the second unit is connected to the output shaft whilst its rotor is connected to the input shaft. Under direct drive conditions, the swash plate of the first unit is set to adjust the displacement of the unit to zero, which also effectively locks the second unit to provide straight through drive without pumping losses. Under starting conditions when the input shaft is rotating and the output shaft is stationary the swash plate is set so that the displacement of the first unit equals the displacement of the second unit at the same speed, the valving between the units being arranged so that the rotor of the second unit rotates in the opposite direction relative to its swash plate so that the net output shaft velocity is zero. As described by the patentees, provision may also be made for reverse and overdrive operation.

A disadvantage of such arrangements is that they are dynamically unbalanced, both because of the eccentric distribution of the fluid in the system and because of the eccentric torque loadings imposed by the units on the structure as a whole. An attempt to overcome this problem is disclosed in U.S. Pat. No. 4,075,843 issued Feb. 28, 1978 to Leker. This makes use of special swash plates with dual camming surfaces. I am unable to follow how these would in fact operate, but in any event the arrangement would necessarily require nonstandard parts of complex profile and thus be expensive to manufacture.

The transmissions discussed above utilize axial piston pump/motor units. Transmissions of the general type discussed have also been proposed using radial piston units, a typical example being U.S. Pat. No. 3,404,584 issued Oct. 8, 1968 to Trautmann. Such an arrangement is more compact, and avoids some of the high stresses involved with swash plate arrangement, but does not solve the out-of-balance problems outlined above. Moreover, it entails the use of an expensive epicyclic gear-set to provide the proper relative rotations between the various parts whilst maintaining proper fluid communication between the two hydraulic units.

The present invention seeks to provide a hydraulic variable speed transmission of the general type discussed above which can largely overcome the out-of-balance problem, which can be implemented utilizing accepted and proven hydraulic pump/motor construction techniques, and which does not require the use of expensive mechanical gearing in the drive train. Certain useful accessory functions such as engine starting may also be provided.

According to the invention, a hydraulic variable speed transmission comprises a casing, an input shaft, an output shaft, a first hydrostatic pump/motor unit within the casing having at least two similar reaction surfaces supported for coordinated non rotative eccentric movement in radial directions equiangularly spaced about the unit axis, a second radial displacement hydraulic pump/motor unit coaxial with the first unit within the casing and having means defining at least two similar equiangularly spaced eccentric reaction surfaces supported for rotation together about the axis of the unit, each unit having a rotor equipped with radially movable displacement control members engaging the reaction surfaces of that unit and coupled to the input and output shafts respectively, the reaction surface defining means of the second unit being supported by a rotatable member coupled to the input shaft, and a stationary commutating valve member between the units to coordinate the transfer of fluid in a closed circuit between the pump/motor units.

Preferably the first pump/motor unit has displacement control members in the form of pistons movable in radial bores arranged in two rings each associated with an annular reaction surface, the reaction surfaces defining means being provided by separate eccentric rings linked for conjoint movement in diametrically opposite directions. The second pump/motor unit preferably has displacement control members in the form of vanes movable in radial slots in the rotor, the reaction surface defining means being an enclosure connected to the rotatable member, and defining a symmetrically bilobar cavity. Such a unit is readily commercially available.

Preferably the apparatus includes an auxiliary pump to maintain fluid pressure in the circuit. Preferably also a hydraulic accumulator is provided to store additional pressurized fluid together with a valve arrangement whereby the second pump/motor unit may be connected between said accumulator and a sump and driven as a motor to turn the input shaft when the output shaft is locked and the eccentricity of the reaction surfaces of the first pump is zero.

Further features of the invention will become apparent from the following description of a preferred embodiment of the invention with reference to the accompanying drawings.

Figure 1:
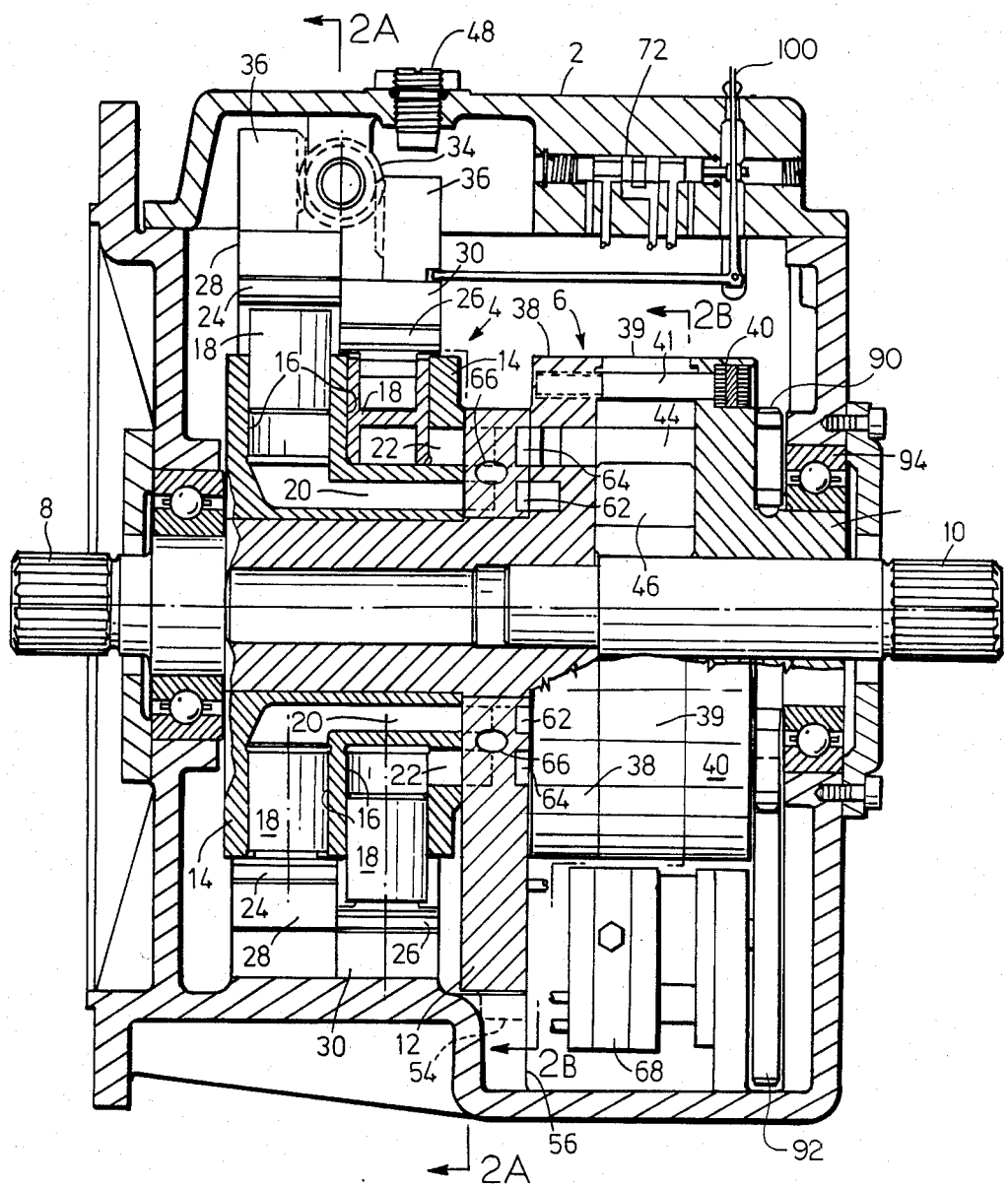
FIG. 1 is an axial section through a vehicle transmission embodying the invention, the upper half showing the rotor of a first pump/motor unit in a position displayed by 20° with respect to the position shown in the lower half so as to illustrate more clearly the operation of the unit.
Figure 2:
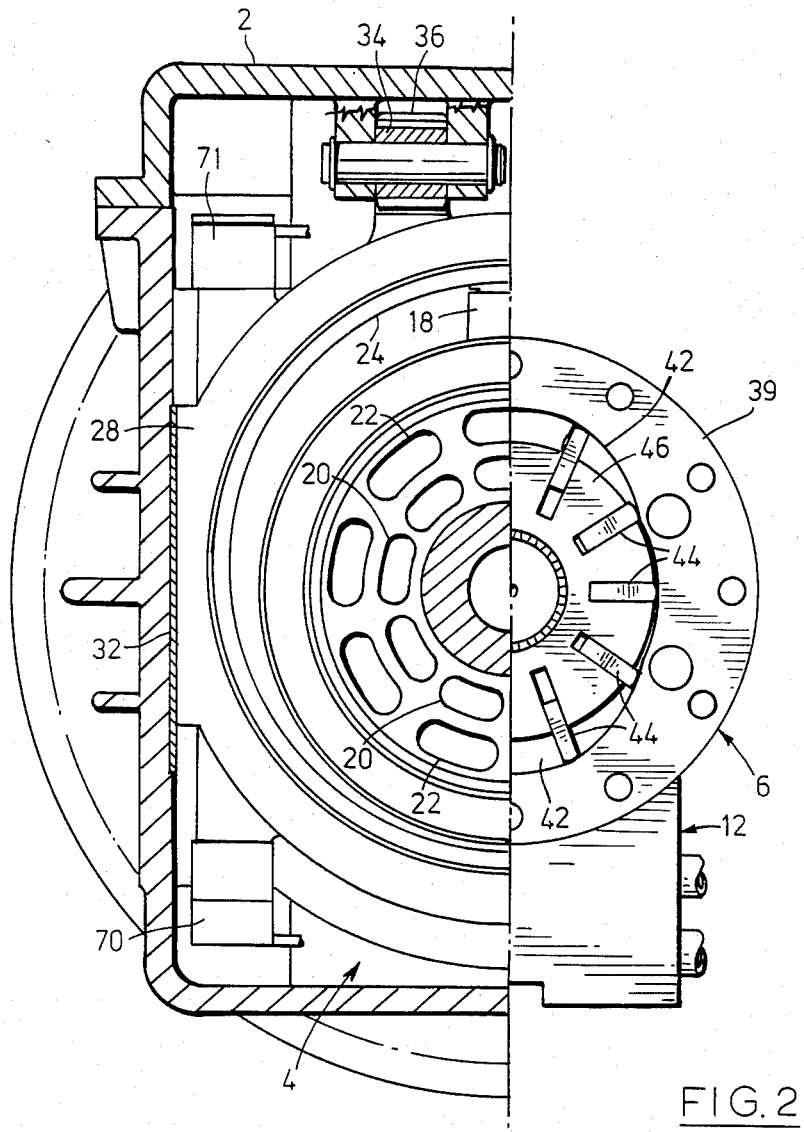
FIG. 2 is a composite transverse section through the transmission, the left hand half being taken on the line 2A—2A in FIG. 1, and the right hand half on the line 2B—2B with the casing of the transmission omitted.

Referring to the drawings, the transmission shown broadly comprises a casing 2, a first pump/motor unit 4, a second pump/motor unit 6, an input shaft 8, an output shaft 10, and a port plate 12. Although the transmission unit is well adapted to automatic control, the details of such control form no part of the invention and will not be described except for the instrumentalities through which such control is achieved.

Whilst both the units 4 and 6 perform both pump and motor functions during different phases of operation of the transmission, the unit 4 operates primarily as a pump under drive conditions, and the unit 6 primarily as a motor. Those units are thus referred to hereafter for simplicity as the pump and the motor respectively.

The pump 4 comprises a cylindrical rotor body 14 having two rings of radially outwardly facing bores 16 containing pistons 18 which act as displacement control members controlling the displacement of hydraulic fluid through rings of inner and outer ports 20 and 22 respectively. The outer ends of the pistons engage reaction surfaces provided by rings 24, 26 mounted in supports 28, 30 which are supported by bearings 32 within the casing 2 for conjoint radial displacement in diametrically opposite directions under control of a pinion 34 engaging opposed racks 36 on the two supports. The supports have a position in which the rings are both concentric with the shafts 8 and 10 and the rotor body 14, but otherwise the action of the pinion 34 causes them to assume equal but opposite degrees of eccentricity. In the concentric position, rotation of the rotor will result in no displacement of the pistons, but increasing eccentricity of the rings will result in increasing piston displacement and thus an increasing rate of fluid displacement through the ports 20 and 22. Movement of the rings beyond their concentric position is prevented by a screw 48.

The body 14 is fast on the input shaft 8, which in turn is connected to an end plate 38 of the motor unit 6. The end plate 38 is secured to an opposite end plate 40 by bolts 41 passing through and supporting an enclosure 39 having a bilobar cavity defining reaction surfaces 42 engaging displacement control members in the form of vanes 44 supported for radial movement by a rotor 46 fast to the output shaft 10.

Figure 3:
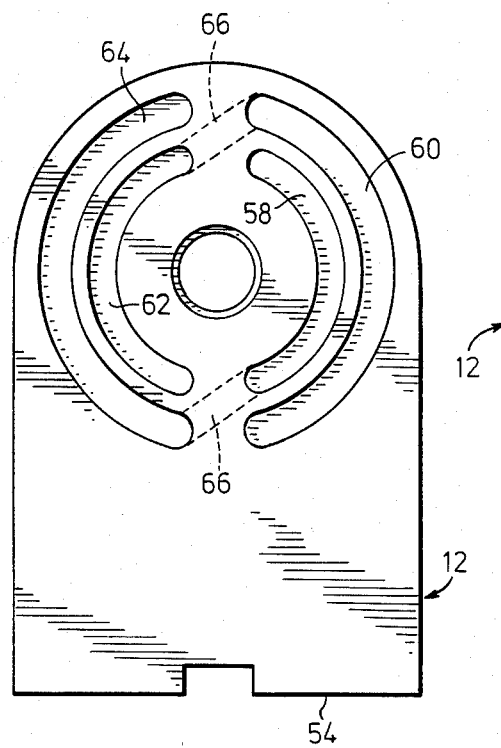
FIG. 3 is a view of a commuting valve member separating first and second pump/motor units, seen from the direction of the first unit.
Figure 4:
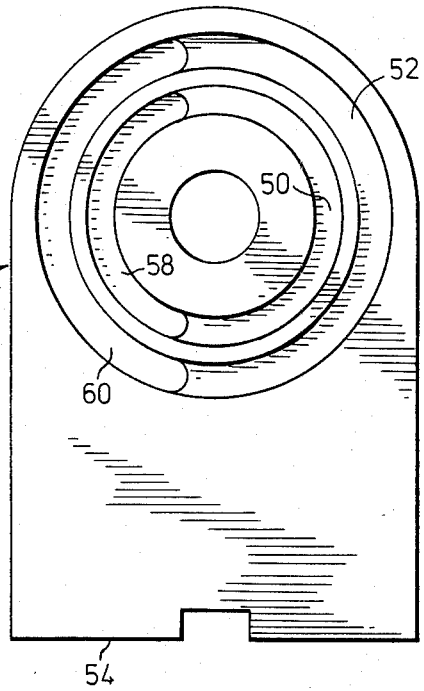
FIG. 4 is a view of the valve member from the direction of the second unit.

The port plate 12 has one face, seen in FIG. 4, in contact with the end plate 38 so that radially inner and radially outer sets of circumferentially spaced ports in the latter communicate respectively with inner and outer annular grooves 50 and 52 such that any displacement of fluid between the grooves via the ports results in displacement of the rotor 46 relative to the enclosure 39 in known manner. The port plate itself is restrained against rotation by feet 54 engaging abutments 56 on the casing. Opposite portions of each annular groove are deepened into slots 58, 60 extending right through the plate to the opposite face seen in FIG. 3, which face has part annular inner and outer grooves 62, 64 formed opposite the slots and connected by internal commutating channels 66 to the slots so that slot 58 and groove 64 communicate with the inner groove 50 and slot 60 and groove 62 communicate with the outer groove 52. This arrangement maintains two separate communication paths between the pump and the motor, whilst commutating the ports 20, 22 from the cylinders in body 14 to allow for successive strokes of the pistons and the opposite phases of the pistons in the two rings, thus maintaining displacement through the motor 6 between the grooves 50 and 52 in a constant direction for a given setting of the rings 24, 26.

Figure 5:
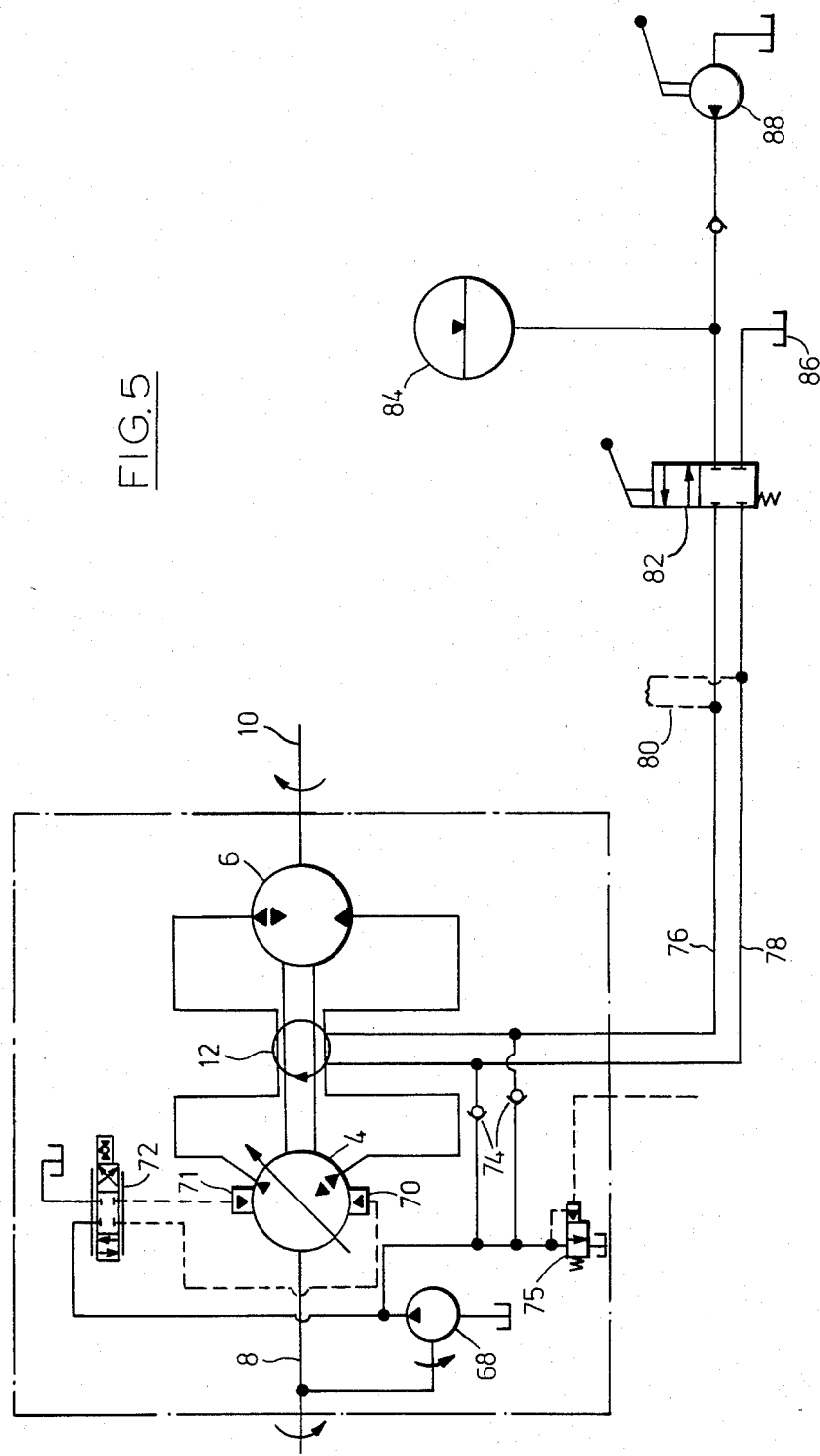
FIG. 5 is a schematic diagram of the hydraulic circuit of the transmission.

Also within the casing 2 is an auxiliary pump 68 used to maintain, through check valves 74 (see FIG. 5), and under control of a relief valve 75, a minimum fluid pressure within the closed circuit formed by the pump 4, the motor 6 and the port plate 12 and also to supply fluid to actuators 70, 71 which move the support 28 and hence the support 30 under control of a spool valve 72. The check valves 74 are located in bores formed within the lower portion of the port plate 12 and communicating with the respective communication paths through the port plate. These paths also have external connections from the port plate through lines 76 and 78, both to connections 80 to any control sensors which may be required to automate control of the transmission, and to a normally closed valve 82, which when open connects the lines respectively to an accumulator 84 and a sump 86 so as to permit the motor 6 to be externally powered. The accumulator may be charged by an external manually operated pump 88 or from the main system through line 76.

In operation, assuming the engine of a vehicle employing the transmission to be stopped, and the vehicle itself to be stationary with its brakes applied, the accumulator 84 is charged if necessary using the manually operated pump 88. The valve 82 is then operated to complete a circuit from the accumulator through the motor 6 and back to the sump 86. Since the output shaft 10 is held stationary, the motor 6 rotates the input shaft 8 and thus the vehicle engine connected to that shaft, developing a much higher speed and torque than is available from a conventional electric starter motor and without any drain on the vehicle electrical system. Once the engine starts the valve 82 can be partially closed so as to cut off the line 78 from the sump and connect the line 76 to the accumulator so that the latter is recharged by the pump 68 which is driven from the input shaft 8 through gears 90, 92 on an extension of the end plate 40. The extension is concentric with the output shaft 10 and journalled in the casing 2 by a bearing 94. Once the line 78 is cut off from the sump, the pump 4 and motor 6 are connected in a closed circuit and the displacement of the pump must equal the displacement of the motor.

Under idling conditions, the supports 28, 30 are moved so that the rings 24, 26 are positioned to provide a pump displacement which is equal to that of the motor when operating at the same speed but phased so that the motor rotor rotates in the opposite direction relative to its body as compared to the pump. Thus the net rotational velocity of the output shaft is zero but the motor is operating at an efficient speed and its full output torque is available as soon as there is any displacement of the supports 28 and 30. There will be pumping losses in the system but at idling speeds these will be low.

Control of the positioning of the supports 28 and 30 is achieved by operation of the spool valve 72 which admits fluid from pump 68 to the cylinder of either actuator 70 or actuator 71 whilst exhausting fluid from the other, and thus either increases or decreases the eccentricity of the rings 24, 26. The valve is operated by a lever 100, which also engages the support 30 to provide feed back and cause the supports to move in accordance with the magnitude and direction of the external force applied to the lever. Increasing force on the lever in one direction, depending upon how the spool valve and the actuators are connected, results in decreasing eccentricity of the rings 24 and 26 and thus a reduced displacement of the pump 4 and a reduced velocity of the rotor of the motor relative to its body which is coupled to the input shaft. Since the rotor of the motor is coupled to the output shaft 10, this results in this shaft having a net velocity in the same direction of the input shaft which increases as the pump displacement is decreased. When the eccentricity of the rings 24 and 26 reaches zero, so does the pump displacement; this in turn means that the motor rotor is rotating at zero velocity relative to its body and thus that the input and output shaft are directly coupled without any fluid displacement except that due to leakage. Transmission efficiency is thus very high. Normally the screw 48 is set so as to prevent further movement of the rings to provide opposite eccentricity, but it may be set if desired to permit an overdrive condition in which the direction of rotation of the motor is reversed so that its velocity is added to that of the input shaft. If the eccentricity is increased rather than decreased from the idling or neutral state, the motor will run faster than the input shaft but in the opposite direction, thus providing a reverse output.

Signals for controlling the transmission may be derived inter alia by sensing the pressure difference existing across the connections 80 which will normally be proportional to the torque being delivered by the transmission. It should be appreciated that under overrun conditions, the functions of the pump and motor are reversed, and even under normal running conditions, each provides what is in effect a combination of pumping and motoring functions.

The dual reaction surfaces in both pump and motor ensure that the transmission is fully balanced about its axis, both in respect of the development of torque and the distribution of fluid in rotating parts. The axial separation of the two rings 24 and 26 necessarily entails the development of small rocking couples but those should not be of significant magnitude. Moreover, no resultant axial forces are developed in the transmission, thus eliminating the need for expensive thrust bearings. The basic components of the pump and motor are of simple and well known radial displacement designs having a reliability generally considered greater than that of the swash plate type axial piston type pumps and motors used in most prior art hydrostatic transmissions of the same general class.

In order for the motor to be externally powered by the accumulator 84, (see FIG. 5) it is desirable that the pump 4 be in its zero displacement state, since otherwise it will develop a torque which except in the overdrive condition will be in opposition to that of the motor. In the normal neutral condition of the transmission, this counter torque should result in zero torque being applied to the engine. Likewise, once the engine is started, the normal neutral condition of the transmission must be restorable. Various expedients may be utilized to this end. The actuators 70 and 71 may be conventionally spring loaded to return the rings 24, 26 to a concentric position when pressure is removed from the system, and the valve 72 may be returned to a corresponding position, maintained by a conventional spring bias, as part of an engine shut down sequence. This shut down sequence may also include temporary movement of the valve 82 to a position connecting line 76 to the accumulator 84 whilst the engine is kept running for long enough to ensure that the accumulator is fully charged. During engine start up, provision must be made to return the transmission pump 4 to a normal neutral condition and to close the valve 82 before the vehicle is operated. It may be advantageous for the transmission control to provide both an idling or "park" condition in which the pump 4 has zero displacement and the accumulator is connected to the hydraulic circuit by the intermediate position of valve 82, and a neutral or zero special condition in which the pump has a displacement equal to that of the motor, the valve 82 is closed and the vehicle is ready for immediate movement. It may also be advantageous in controlling the system to provide for the circuit to valve 72 to be pressurized from the accumulator 84 during starting.

I claim:

1. A hydraulic variable speed transmission comprising a casing, an input shaft, an output shaft, a first hydrostatic pump/motor unit within the casing having at least two similar reaction surfaces supported for coordinated non rotative eccentric movement in radial directions equiangularly spaced abot the unit axis, a second hydraulic pump/motor unit coaxial with the first unit within the casing and having means defining at least two similar equiangularly spaced reaction surfaces supported for rotation together about the axis of the unit, each unit having rotor equipped with radially movable displacement control members engaging the reaction surfaces of that unit and coupled to the input and output shafts respectively, the reaction surface defining means of the second unit being supported by a rotatable member coupled to the input shaft, a stationary commutating valve member establishing two independent paths for fluid flow between the units whereby to coordinate the transfer of fluid in an internal circuit between the pump/motor units, and an external hydraulic circuit including at least one source of pressurized hydraulic fluid, said valve member including means establishing external connections between said independent paths and said external hydraulic circuit whereby pressurized fluid may be transferred bidirectionally between said internal circuit and said external circuit and whereby a difference in the fluid pressure in said two independent paths may be selectively responded to or maintained by said external circuit.

2. A transmission according to claim 1, wherein the first pump/motor unit has displacement control members in the form of pistons movable in radial bores arranged in two rings each associated with an annular reaction surface, the reaction surfaces defining means being provided by separate eccentric rings linked for conjoint movement in diametrically opposite directions.

3. A transmission according to claim 1, wherein the second pump/motor unit has displacement control members in the form of vanes movable in radial slots in the rotor, the reaction surface defining means being an enclosure connected to the rotatable member, and defining a symmetrically bilobar cavity.

4. A transmission according to claim 2, wherein the second pump/motor unit has displacement control members in the form of vanes movable in radial slots in the rotor, the reaction surface defining means being an enclosure connected to the rotatable member, and defining a symmetrically bilobar cavity.

5. A transmission according to claim 1 or 4, wherein the at least one source of pressurized hydraulic fluid in the external circuit includes an auxiliary pump to maintain fluid pressure in the circuit.

6. A transmission according to claim 1 or 4, wherein the at least one source of pressurized hydraulic fluid in the external circuit includes a hydraulic accumulator, and the external circuit further includes a sump and valve means operable to connect the second pump/motor unit into a hydraulic circuit between the accumulator and the sump whereby to drive it as a motor to turn the input shaft when the output shaft is locked.

* * * * *